United States Patent
Guo et al.

(10) Patent No.: US 10,362,578 B2
(45) Date of Patent: Jul. 23, 2019

(54) TM9-BASED CARRIER AGGREGATION METHOD AND DEVICE

(71) Applicant: DATANG MOBILE COMMUNICATIONS EQUIPMENT CO., LTD., Beijing (CN)

(72) Inventors: Fengran Guo, Beijing (CN); Yi Shen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 128 days.

(21) Appl. No.: 15/515,894

(22) PCT Filed: Sep. 10, 2015

(86) PCT No.: PCT/CN2015/089380
§ 371 (c)(1),
(2) Date: Mar. 30, 2017

(87) PCT Pub. No.: WO2016/050137
PCT Pub. Date: Apr. 7, 2016

(65) Prior Publication Data
US 2017/0325211 A1    Nov. 9, 2017

(30) Foreign Application Priority Data

Sep. 30, 2014  (CN) .......................... 2014 1 0521497

(51) Int. Cl.
*H04W 72/04* (2009.01)
*H04L 5/00* (2006.01)
(Continued)

(52) U.S. Cl.
CPC .......... *H04W 72/048* (2013.01); *H04L 5/001* (2013.01); *H04L 5/0016* (2013.01);
(Continued)

(58) Field of Classification Search
CPC . H04W 72/048; H04W 72/082; H04W 88/06; H04L 5/001; H04L 5/0016; H04L 5/0098
See application file for complete search history.

(56) References Cited

U.S. PATENT DOCUMENTS

2012/0236771 A1* 9/2012 Luo ..................... H04L 1/1607
370/311
2013/0142125 A1* 6/2013 Shimezawa ............ H04B 7/046
370/328

(Continued)

FOREIGN PATENT DOCUMENTS

CN    102104460 A    6/2011
CN    103716891 A    4/2014
(Continued)

OTHER PUBLICATIONS

Apr. 4, 2017 International Preliminary Report on Patentability issued in International Application No. PCT/CN2015/089380.
(Continued)

*Primary Examiner* — Kwang B Yao
*Assistant Examiner* — Moo Jeong
(74) *Attorney, Agent, or Firm* — Oliff PLC

(57) ABSTRACT

A TM9-based carrier aggregation (CA) method and device, wherein the method includes: a network side device determining a component carrier (CC) currently activated in a CA system; if a CC configured with TM9 exists in the currently activated CCs, the network side device determining a CC transmission mode (TM) for the CC configured with TM9; the network side device transmitting data to a UE according to the TM. An embodiment enables a CA cell to support CA of 8 downlink (DL) ports for TD-LTE-A cell using TM9, thus increasing user rate and improving user experience. The
(Continued)

method increases checkpoints such as maximum supporting data streams and UE capability, thus increasing user throughput.

14 Claims, 3 Drawing Sheets

(51) Int. Cl.
  *H04W 72/08* (2009.01)
  *H04W 88/06* (2009.01)
(52) U.S. Cl.
  CPC ......... *H04W 72/082* (2013.01); *H04L 5/0098* (2013.01); *H04W 88/06* (2013.01)

(56) References Cited

U.S. PATENT DOCUMENTS

| | | | | |
|---|---|---|---|---|
| 2014/0269383 | A1* | 9/2014 | He | H04W 28/24 370/252 |
| 2015/0117350 | A1* | 4/2015 | Seo | H04L 1/06 370/329 |
| 2015/0333884 | A1* | 11/2015 | Athley | H04L 5/0048 375/295 |
| 2016/0050680 | A1* | 2/2016 | Simonsson | H04B 7/0689 370/329 |

FOREIGN PATENT DOCUMENTS

| | | |
|---|---|---|
| CN | 104301083 A | 1/2015 |
| WO | 2014/051378 A1 | 4/2014 |

OTHER PUBLICATIONS

Dec. 15, 2015 Written Opinion of the International Searching Authority issued in International Application No. PCT/CN2015/089380.

Dec. 15, 2015 International Search Report issued in International Application No. PCT/CN2015/089380.

* cited by examiner

TM9-BASED CARRIER AGGREGATION METHOD AND DEVICE

This application claims the benefit of priority from Chinese Patent Application No. 201410521497.1, filed on Sep. 30, 2014, entitled "TM9-Based Carrier Aggregation Method and Device", the entire contents of which are hereby incorporated by reference in this application.

TECHNICAL FIELD

The present invention relates to the field of communication technology, and more particularly to a TM-9 based carrier aggregation method and device.

BACKGROUND TECHNOLOGY

FIG. 1 is a networking diagram of the carrier aggregation system, carrier aggregation (CA) of TD-LET (Time Division-Long Time Evolution) cells are mainly based on the bandwidth of 10 M and 20 M, and be conducted in the D, E, and F bands. In a CA system, a plurality of component carriers (CC) simultaneously serving a User Equipment (UE) are classified into Primary Component Carrier (PCC) and Secondary Component Carrier (SCC). The cell corresponding to PCC is called Primary Cell (PCell), PCell will inherit the full function of the service cell of Long Term Evolution (LTE); the cell corresponding to SCC is called Secondary Cell (SCell), and SCell will only bear the function of data transmission. PCell and SCell are viewed from the point of UE, PCell contains downlink (DL) CC and uplink (UL) CC, Scell can contain only DL CC, but it can't contain only UL CC.

As the technology of Long Term Evolution-Advanced (LTE-A) and UE evolve, the LTE-A cell will support transmission mode 9 (TM9), a maximum of 8 ports can be configured for the DL of a cell, which can support up to 8 streams of data transmission for a single user, with transmission rate far exceeding the LTE cell. However, due to the limitation of the UE's transmitting antenna, the CA cell of the present stage mainly considers single/dual-stream transmission, the CA cell does not support CA of 8 DL ports for TD-LTE-A cell using TM9.

INVENTION SUMMARY

An embodiment of the present invention provides a TM9-based CA method and device which enables a CA cell to support CA of 8 DL ports for TD-LTE-A cell using TM9, thus increasing user rate.

An embodiment of the present invention provides a TM9-based CA method which comprises of:

A network side device determines a CC is currently activated in a CA system;

If a CC configured with TM9 exists in the currently activated CCs, the network side device determines a CC transmission mode (TM) for the CC configured with TM9;

The network side device transmits data to a UE according to the TM.

If the CA configured with TM9 is a SCC, the network side device determines the TM of the CC, which specifically comprising:

The network side device judges whether the UE supports UL CA function;

If the UE supports UL CA function, under codebook condition, the network side device determines the TM of the CC as TM9; or, under non-codebook condition, the network side device determines the TM of the CC as non-codebook TM9;

If the UE does not support UL CA function, under codebook condition, the network side device determines the TM of the CC as codebook TM9; or, under non-codebook condition, the network side device determines the TM of the CC as TM3;

When the CC configured with TM9 is a PCC, the network side device determines the TM of the CC, which specifically comprising:

Under codebook condition, the network side device determines the TM of the CC as codebook TM9; or, under non-codebook condition, determines the TM of the CC as non-codebook TM9;

The process of the network side device determining the TM of the CC as codebook TM9 specifically comprising: the network side device judges whether the number of ports configured on the network side device is greater than or equal to 4;

If the number of ports configured on the network side device is not greater than or equal to 4, the network side device determines the TM of the CC as codebook TM9 single-stream or codebook TM9 dual-stream;

If the number of ports configured on the network side device is greater than or equal to 4, the network side device judges whether the number of streams supported by the UE is greater than or equal to 4;

If the maximum number of streams supported by the UE is not greater than or equal to 4, the network side device determines that the TM of the CC as codebook TM9 single-stream or codebook TM9 dual-stream;

If the maximum number of streams supported by the UE is greater than or equal to 4, the network side device determines the TM of the CC as codebook TM9 four-stream or codebook TM9 eight-stream.

After the network side device determines the TM of the CC, the method further comprises of: the network side device transmits the TM of the CC to the UE;

When the TM of the CC is codebook TM9 single-stream or codebook TM9 dual-stream, and the SCC enables the adaptive function between modes, if RSRP (Reference Symbol Received Power) is greater than the preset first threshold, and SINR (Signal-to-Interference plus Noise Ratio) is greater than the preset second threshold, the TM is adapted to TM3 by the UE; otherwise, the TM is adapted to TM9 single-stream or TM9 dual-stream;

When the TM of the CC is codebook TM9 four-stream or codebook TM9 eight-stream, and the SCC enables the adaptive function between modes, if RSRP is greater than the preset third threshold and SINR is greater than the fourth threshold, the TM is adapted to TM9 four-stream or TM9 eight-stream by the UE; otherwise, the TM is adapted to TM3.

An embodiment of the present invention provides a TM9-based CA method, which comprises of:

A user equipment (UE) receives the TM of a CC from a network side device;

When the TM of the CC is codebook TM9 single-stream or codebook TM9 dual-stream, and the SCC enables the adaptive function between modes, if RSRP is greater than the preset first threshold and SINR is greater than the preset second threshold, the UE adapts the TM to TM3; otherwise, the UE adapts the TM to TM9 single-stream or TM9 dual-stream;

When the TM of the CC is codebook TM9 four-stream or codebook TM9 eight-stream, and the SCC enables the adaptive function between modes, if RSRP is greater than the preset third threshold and SINR is greater than the preset fourth threshold, the UE adapts the TM to TM9 four-stream or TM9 eight-stream; otherwise, the UE adapts the TM to TM3.

An embodiment of the present invention provides a network side device which comprises of:

The #1 determining module for determining the CC currently activated in the CA system;

The #2 determining module for determining the TM of CC configured with TM9 when there is CC configured with TM9 in the currently activated CCs;

The transmission module for transmitting data to the UE according to the TM.

The above mentioned #2 determining module is specifically used to judge if the UE supports UL CA function when the CC configured with TM9 is a SCC; if the UE supports UL CA function, under codebook condition, the UE determines the TM of the CC as codebook TM9; or, under non-codebook condition, the UE determines the TM of the CC as non-codebook TM9; if the UE does not support UL CA function, under codebook condition, the UE determines the TM of the CC as codebook TM9; or, under non-codebook condition, the UE determines the TM of the CC as TM3.

The #2 determining module is specifically used in that when the CC configured with TM9 is the PCC, under codebook condition, the TM of the CC is determined as codebook TM9; or, under non-codebook condition, the TM of the CC is determined as non-codebook TM9.

The #2 determining module is further used to judge whether the number of ports configured on the network side device is greater than or equal to 4 during the process of determining the TM of the CC is codebook TM9; if the number of ports configured on the network side device is not greater than or equal to 4, the TM of the CC is determined to be codebook TM9 single-stream or codebook TM9 dual-stream; if the number of ports configured on the network side device is greater than or equal to 4, it is judged whether the maximum number of streams supported by the UE is greater than or equal to 4; if the maximum number of streams supported by the UE is not greater than or equal to 4, the TM of the CC is determined as codebook TM9 single-stream or codebook TM9 dual-stream; if the maximum number of streams supported by the UE is greater than or equal to 4, the TM of the CC is determined as codebook TM9 four-stream or codebook TM9 eight-stream.

The transmission module is also used to transmit the TM of the CC to the UE after the TM of the CC is determined; when the TM of the CC is codebook TM9 single-stream or codebook TM9 dual-stream, and the SCC enables the adaptive function between modes, if RSRP is greater than the preset first threshold and SINR is greater than the preset second threshold, the TM is adapted to TM3; otherwise, the TM is adapted to TM9 single-stream or TM9 dual-stream; when the TM of the CC is codebook TM9 four-stream or codebook TM9 eight-stream, and the SCC enables the adaptive function between modes, if RSRP is greater than the preset third threshold and SINR is greater than the preset fourth threshold, the TM is adapted to TM9 four-stream or TM9 eight-stream; otherwise, the transmission mode is adapted to TM3.

An embodiment of the present invention provides a user equipment (UE) which specifically comprises of:

A receiving module for receiving the TM of CC from a network side device;

A processing module. When the TM of the CC is codebook TM9 single-stream or codebook TM9 dual-stream, and the SCC enables the adaptive function between modes, if RSRP is greater than the preset first threshold, and SINR is greater than the preset second threshold, the TM is adapted to TM3; otherwise, the TM is adapted to TM9 single-stream or TM9 dual-stream; or, when the TM of the CC is codebook TM9 four-stream or codebook TM9 eight-stream, and the SCC enables the adaptive function between modes, if RSRP is greater than the preset third threshold, and SINR is greater than the preset fourth threshold, the TM is adapted to TM9 four-stream or TM9 eight-stream; otherwise, the TM is adapted to TM3.

A network side device which specifically comprises of:

A processor for reading programs in the memory and performing the following processes:

Determine the CC that is currently activated in the CA system, and determine the TM of the CC when there is CC configured with TM9 in the currently active CCs, and transmit data to the UE according to the TM.

A transceiver for receiving and transmitting data under the control of the processor.

Preferably, the processor is specifically used to:

Determine whether the UE supports UL CA function when the CC configured with TM9 is SCC; if the UE supports UL CA function, under codebook condition, the TM of the CC is determined as codebook TM9; or, under non-codebook condition, the TM of the CC is determined as non-codebook TM9; if the UE does not support UL CA function, under codebook condition, the TM of the CC is determined as codebook TM9; or, under non-codebook condition, the TM of the CC is determined as TM3.

Preferably, the processor is specifically used to:

When the CC configured with TM9 is the PCC, under codebook condition, the TM of the CC is determined as codebook TM9; or, under non-codebook condition, the TM of the CC is determined as non-codebook TM9.

Preferably, the processor is further used to:

Determine whether the number of ports configured on the network side device is greater than or equal to 4 during the process of determining the TM of the CC as codebook TM9; if the number of ports configured on the network side device is not greater than or equal to 4, the TM of the CC is determined as codebook TM9 single-stream or codebook TM9 dual-stream; if the number of ports configured on the network side device is greater than or equal to 4, it is judged whether the number of streams supported by the UE is greater than or equal to 4; if the maximum number of streams supported by the UE is not greater than or equal to 4, the TM of the CC is determined as codebook TM9 single-stream or codebook TM9 dual-stream; if the maximum number of streams supported by the UE is greater than or equal to 4, the TM of the CC is determined as codebook TM9 four-stream or codebook TM9 eight-stream.

Preferably, the processor is further used to:

Transmit the TM of the CC to the UE through transceiver 410 after determining the TM of the CC; when the TM of the CC is codebook TM9 single-stream or codebook TM9 dual-stream, and the SCC enables the adaptive function between modes, if RSRP is greater than the preset first threshold and SINR is greater than the preset second threshold, the TM is adapted to TM3 by the UE; otherwise, the TM is adapted to TM9 single-stream or TM9 dual-stream; when the TM of the CC is codebook TM9 four-stream or codebook TM9 eight-stream, and the SCC enables the adaptive function between modes, if RSRP is greater than the preset third threshold and SINR is greater than the preset fourth threshold, the TM is adapted to TM9 four-stream or codebook TM9 eight-stream by the UE; otherwise, the TM is adapted to TM3.

A UE, which specifically comprises of:

A transceiver for receiving and transmitting data under the control of the processor.

A processor for receiving the TM of a CC from a network side device through a transceiver, reading programs in the memory, and performing the following processes:

When the TM of the CC is codebook TM9 single-stream or codebook TM9 dual-stream, and the SCC enables the adaptive function between modes, if RSRP is greater than the preset first threshold, and SINR is greater than the preset second threshold, the TM is adapted to TM3; otherwise, the TM is adapted to TM9 single-stream or TM9 dual-stream; or, when the TM of the CC is codebook TM9 four-stream or codebook TM9 eight-stream, and the SCC enables the adaptive function between modes, if RSRP is greater than the preset third threshold, and SINR is greater than the preset fourth threshold, the TM is adapted to TM9 four-stream or TM9 eight-stream; otherwise, the TM is adapted to TM3;

Compared with the prior art, the embodiment of the present invention has at least the following advantages: In the embodiment of the present invention, the CA cell can support CA of 8 DL ports for TD-LTE-A cell using TM9, thus increasing user rate and improving user experience. Further, the above-described method increases check points such as maximum number of data streams supported, UE capabilities, etc., thus increasing user throughput.

DETAILED DESCRIPTION

In order to make the objects, technical solutions and advantages of the embodiments of the present invention clearer, technical solutions in the embodiments of the present invention will be clearly and completely described below with reference to the accompanying drawings in the embodiments of the present invention. It is obvious that the described embodiments are only some, not all the embodiments of the present invention. All other embodiments obtained by technical personnel in this field without any creative work and based on the embodiments of the present invention, are within the scope of protection of the present invention.

It is to be understood that the technical solution of the present invention can be applied to various communication systems such as GSM (Global System of Mobile communication) system, CDMA (Code Division Multiple Access) system, WCDMA (Wideband Code Division Multiple Access) system, GPRS (General Packet Radio Service) system, LTE (Long Term Evolution) system, LTE-A (Advanced Long Term Evolution) system, UMTS (Universal Mobile Telecommunication System), and the like.

It should also be understood that in the embodiment of the present invention, a User Equipment (UE) includes, but is not limited to, Mobile Station (MS), Mobile Terminal, Mobile Telephone, handset, and portable device, etc., which may communicate with one or more core networks via a Radio Access Network (RAN). For example, a UE may be a mobile phone (or "cellular" phone), a computer with wireless communication function, etc., and it may also be a portable, pocket-sized, hand-held, computer built-in or vehicle-mounted mobile device.

In the embodiments of the present invention, a base station (e.g., an access point) may refer to a device in an access network that communicates with a wireless terminal over an air interface over one or more sectors. The base station may be used to convert the received air frame to an IP packet, to function as a router between the wireless terminal and the rest of the access network, wherein the remainder of the access network may comprise an Internet Protocol (IP) network. The base station may also coordinate the management of the air interface attributes. For example, the base station may be a Base Transceiver Station (BTS) in GSM or CDMA, a NodeB in WCDMA, or an evolved base station in LTE (NodeB, eNB or e-NodeB (evolutional Node B)), the present invention is not limited thereto.

Embodiment 1

Figure 1:
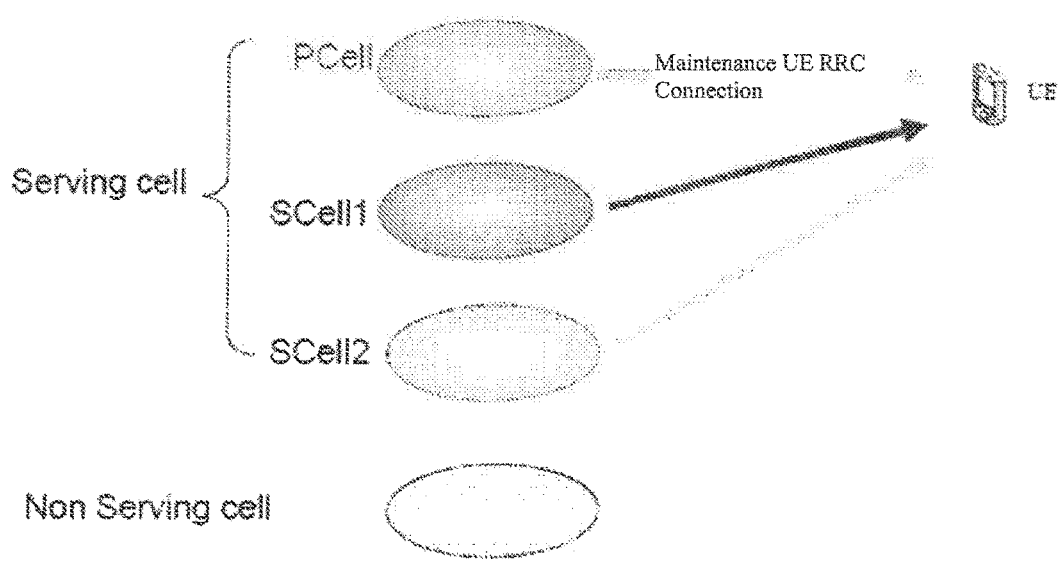
FIG. 1 is the network diagram of the prior art CA system.
Figure 2:
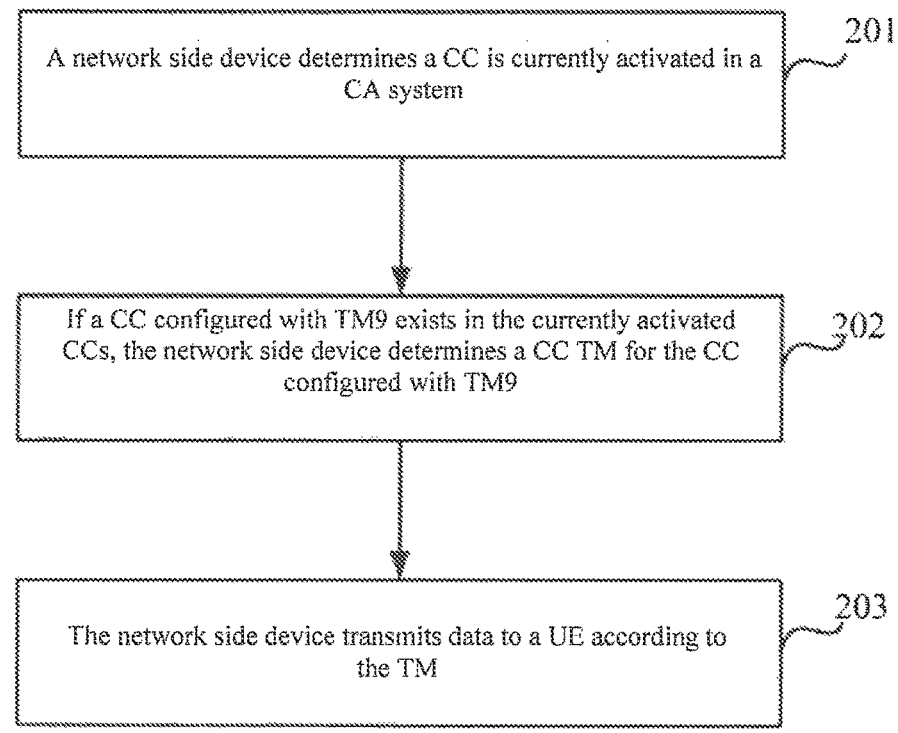
FIG. 2 is the flow chart of a TM9-based CA method according to an embodiment of the present invention.

Targeting the problems of the prior art, the #1 embodiment of the present invention provides a TM9-based CA method. As shown in FIG. 2, the TM9-based CA method comprises the following steps:

Step 201, the network side device determines the component carrier that is currently activated in the CA system.

In the embodiment of the present invention, in the CA system, the CA process specifically includes, but is not limited to, the configuration process of the CA cell and the activation/deactivation process of SCC.

During the configuration process of a CA cell, a CC is configured as PCC and the other CC(s) is(are) configured as SCC(s). Further, when the CA relationship is added, a set of CA parameters can be configured, such as UL CA switch, DL CA switch, CA cross-carrier scheduling switch, CA activation/deactivation ratio threshold, CA activation data volume threshold, carrier aggregation deactivation data volume threshold, and so on. Further, a set of default CA parameters may be configured to the CA relationship, which may be adjusted specifically.

During the process of activation/deactivation of SCC, activation/deactivation of SCC may be conducted according to the activation/deactivation algorithm shown in Table 1. For example, when the CA relationship is configured, if UE1 is attached to PCC, and the data volume on UE1 reaches the CA activation threshold, and the parameters meet CA condition, SCC will be activated.

TABLE 1

| Activation type | Algorithm | Algorithm description |
| --- | --- | --- |
| Downlink activation algorithm | Activation based on user traffic rate requirements | The data volume of the downlink PDCP (Packet Data Converge Protocol) is monitored. By comparing the amount of data in the statistics period with the set threshold. if N consecutive statistics results are greater than the activation threshold, the SCC is activated. |
| | Activation based on QoS/RLC congestion/PRB (Physical Resource Block) Utilization | When QoS (Quality of Service) doesn't meet requirements continuously or RLC (Radio Link Control) is congested, if the downlink PRB of Scell is lower than the configured activation threshold for Scell PRB Utilization, the SCC is activated |
| Downlink deactivation algorithm | Deactivation based on the amount of traffic data | The downlink PDCP data volume is monitored. By comparing the amount of data in the statistics period with the set threshold, if N consecutive statistics results are smaller than the activation threshold, the SCC is deactivated |
| | Deactivation based on MCS&QoS&RLC Congestion | MCS (Modulation and Coding Style) is lower than the set deactivation threshold, QoS meets the requirement, and RLC is not congested, if these conditions are met for N consecutive times, the SCC is deactivated |

Based on the above processing, the network side device can determine the CC which is currently activated in the CA system and determine whether there is a CC configured with TM9 in the currently active CCs.

Step 202, if there is a CC configured with TM9 in the currently active CAs, the network side device determines the TM of this CC.

In the embodiment of the present invention, when the SCC is activated, the scheduling of the PCC and the SCC is conducted separately, that is, according to the general strategy, the PCC and the SCC are independently scheduled, based on the condition of UE, they will determine their own TM and DCI (DownLink Control Information) format. For CC configured with TM9, it will be processed according to the technical solution provided by the embodiment of the present invention; for CC which is not configured with TM9, it will be processed according to the prior art. For example, TD-LTE cell A is PCC, the TD-LTE cell A is configured with transmission mode TM3; LTE-A cell B is the SCC, and LTE-A cell B is configured with transmission mode TM9, then, for CC configured with TM9 (LTE-A cell B), it shall be processed according to the technical solutions provided in the present invention, which shall be explained in detail in the following sections; for CC configured with TM3 (TD-LTE cell A), it shall be processed according to the prior art, which will not be described in the embodiments of the present invention.

In the embodiment of the present invention, when the CC configured with TM9 is the SCC, the network side device determines the TM of the CC, specifically including but not limited to: the network side device judges whether the UE supports UL CA function; if the UE supports UL CA function, under codebook condition, the network side device determines the TM of the CC as codebook TM9; or, under non-codebook condition, the network side device determines the TM of the CC is non-codebook TM9; if the UE does not support UL CA function, under codebook condition, the network side device determines the TM of the CC as codebook TM9; or, under non-codebook condition, the network side device determines the TM of the CC as TM3.

Further, the process that the network side device determines the TM of the CC as codebook TM9 specifically comprises of but not limited to: the network side device judges whether the number of ports configured on the network side device is greater than or equal to 4; if the number of ports configured on the network side device is not greater than or equal to 4, the network side device determines the TM of the CC as TM9 single-stream or codebook TM9 dual-stream; if the number of ports configured on the network side device is greater than or equal to 4, the network side device judges whether the maximum number of streams supported by the UE is greater than or equal to 4; if the maximum number of streams supported by the UE is not greater than or equal to 4, the network side device determines the TM of the CC as codebook TM9 single-stream or codebook TM9 dual-stream; if the number of streams supported by the UE is greater than or equal to 4, the network side device determines the TM of the CC as codebook TM9 four-stream or codebook TM9 eight-stream.

Wherein, since the UL CA function requires that UE has two transmitting antennas so that the PCC and the SCC can simultaneously transmit uplink data, therefore, if the UE supports UL CA function, the uplink data may be transmitted on the SCC, under codebook condition, the network side device determines the TM of the CC as codebook TM9; under non-codebook condition, the network side device determines the TM of the CC as non-codebook TM9. If the UE does not support UL CA function, the UE uplink supports only one CC, that is, the PCC. For the SCC, under codebook condition, the network side device determines the TM of the CC as codebook TM9. Or, under non-codebook condition, the network side device determines the TM of the CC as TM3, not non-codebook TM9.

In the embodiment of the present invention, when the CC configured with TM9 is the PCC, the process that the network side device determines the TM of the CC comprises of but not limited to: under codebook condition, the network side device determines the TM of the CC as codebook TM9; or, under non-codebook condition, the network side device determines the TM of the CC as non-codebook TM9.

Further, the process that the network side device determines the TM of the CC as codebook TM9 specifically comprises of but not limited to: the network side device judges whether the number of ports configured on the network side device is greater than or equal to 4; if the number of ports configured on the network side device is greater than or equal to 4, the network side device determines the TM of the CC as codebook TM9 single-stream or codebook TM9 dual-stream; if the number of ports configured on the network side device is greater than or equal to 4, the network side device judges whether the maximum number of streams supported by the UE is greater than or equal to 4; if the maximum number of streams supported by the UE is not greater than or equal to 4, the network side device determines the TM of the CC as codebook TM9 single-stream or codebook TM9 dual-stream; if the maximum number of streams supported by the UE is greater than or equal to 4, the network side device determines the TM of the CC as codebook TM9 four-stream or codebook TM9 eight-stream.

In the embodiment of the present invention, the CC configured with TM9 may be used as SCC or PCC. Further, the PCC needs to be always activated regardless of whether the UE supports UL CA function.

Step 203, the network side device transmits data to the UE in accordance with the TM (i.e., the TM of the CC configured with TM9 determined in step 202). Wherein, the network side device can adjust the format of the data transmission according to channel environment, and then transmit data to the UE using this format after the TM of the CC (such as the PCC or the SCC) has been determined.

In the embodiment of the present invention, after determining the TM of the CC, the network side device may transmit the TM of the CC (such as the PCC or the SCC configured with TM9) to the UE, and the UE shall receive the TM of the CC.

Further, when the TM of the CC is codebook TM9 single-stream or codebook TM9 dual-stream, and the SCC enables the adaptive function between modes, if the UE's RSRP (Reference Signal Received Power) is greater than the preset first threshold, and the UE's SINR (Signal to Interference plus Noise Ratio) is greater than the preset second threshold, the UE adapts the transmission mode to TM3; otherwise, the UE adapts the transmission mode to TM9 single-stream or TM9 dual-stream. Further, if the TM of the CC is codebook TM9 four-stream or codebook TM9 eight-stream, and the SCC enables the adaptive function between modes, if UE's RSRP is greater than the preset third threshold and SINR is greater than the preset fourth threshold, the UE adapts the transmission mode to TM9 four-stream or TM9 eight-stream; otherwise, the UE adapts the transmission mode to TM3.

Wherein, the preset first threshold, second threshold, third threshold, and fourth threshold can be arbitrarily set according to practical experience. When RSRP of the UE is greater than the preset first threshold, it indicates that the RSRP value is fine, for example, the preset first threshold is −100 dBm. When SINR of the UE is greater than the preset second threshold, it indicates that the SINR value is fine, for example, the preset second threshold is 18 dB. When RSRP of the UE is greater than the preset third threshold, it indicates the RSRP value is fine, for example, the preset third threshold is −100 dBm. When SINR of the UE is greater than the preset fourth threshold, it indicates the SINR value is fine, for example, the preset fourth threshold is 18 dB.

In summary, the embodiment of the present invention has at least the following advantages. In the embodiment of the present invention, the CA cell can support CA of 8 DL ports for the TD-LTE-A cell using TM9, thus increases user rate and improves user experience. Further, the above-described method increases check points such as maximum number of supported data streams, UE capabilities, etc., so as to increase user throughput. Further, on the basis of the existing TD-LTE cell CA, by considering the case where the TM9 cell is activated as the SCC and then determine the TM to be used for data transmission, more check points are added such as the maximum number of supported data streams, UE capability, etc., thus increasing user throughput and user rate for CA.

Embodiment 2

Figure 3:
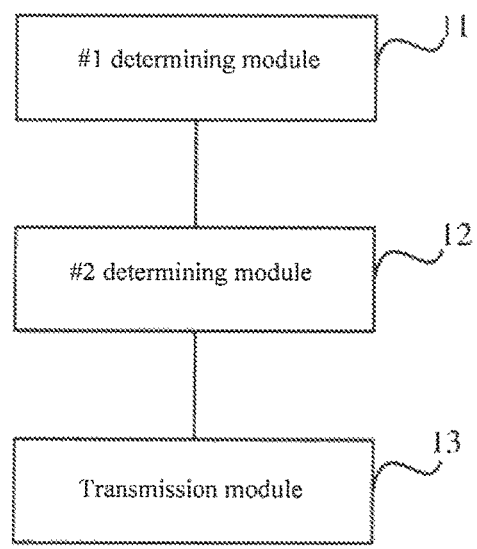
FIG. 3 is a schematic diagram showing the configuration of a network side device according to the second embodiment of the present invention.

Based on the same inventive concept as the above-described method, a network side device is also provided in the embodiment of the present invention, as shown in FIG. 3, which specifically comprises of:

1 determining module (11) for determining the CC which is currently activated in the CA system;

2 determining module (12) for determining the TM of the CC for a CC configured with TM9 when it exists in the currently active CCs;

Transmission module (13) for transmitting data to the user equipment (UE) according to the TM.

The #2 determining module (12) is specifically used to determine whether the UE supports UL CA function when the CC configured with TM9 is a SCC; if the UE supports UL CA function, under codebook condition, the TM of the CC is determined as codebook TM9; or, under non-codebook condition, the TM of the CC is determined as non-codebook TM9; if the UE does not support UL CA function, under codebook condition, the TM of the CC is determined as codebook TM9; or, under non-codebook condition, the TM of the CC is determined as TM3.

The #2 determining module (12) is specifically used to conduct the following: when the component carrier configured with TM9 is the PCC, under codebook condition, the TM of the CC is determined as codebook TM9; or, under non-codebook condition, the TM of the CC is determined as non-codebook TM9.

The #2 determining module (12) is further used to determine whether the number of ports configured on the network side device is greater than or equal to 4 during the process of determining the TM of the CC as codebook TM9; if the number of ports configured on the network side device is not greater than or equal to 4, the TM of the CC is determined to be codebook TM9 single-stream or codebook TM9 dual-stream; if the number of ports configured on the network side device is greater than or equal to 4, it is judged whether the maximum number of streams supported by the UE is greater than or equal to 4; if the maximum number of streams supported by the UE is not greater than or equal to 4, the TM of the CC is determined as codebook TM9 single-stream or codebook TM9 dual-stream; if the maximum number of streams supported by the UE is greater than or equal to 4, the TM of the CC is determined as codebook TM9 four-stream or codebook TM9 eight-stream.

The transmission module (13) is further used to transmit the TM of the CC to the UE after determining the TM of the CC; when the TM of the CC is codebook TM9 single-stream or codebook TM9 dual-stream, and the SCC enables the adaptive function between modes, RSRP is greater than the preset first threshold, and SINR is greater than the preset second threshold, the transmission mode is adapted to TM3; otherwise, the transmission mode is adapted to TM9 single-stream or TM9 dual-stream; when the TM of the CC is codebook TM9 four-stream or codebook TM9 eight-stream, and the SCC enables the adaptive function between modes, if RSRP is greater than the preset third threshold and SINR is greater than the preset fourth threshold, the transmission mode is adapted to TM9 four-stream or TM9 eight-stream; otherwise, the transmission mode is adapted to TM3.

Wherein, the modules of the device in the present invention may be integrated in one unit or deployed separately. The above modules can be combined into one module, or can be further divided into multiple sub-modules.

Embodiment 3

Figure 4:
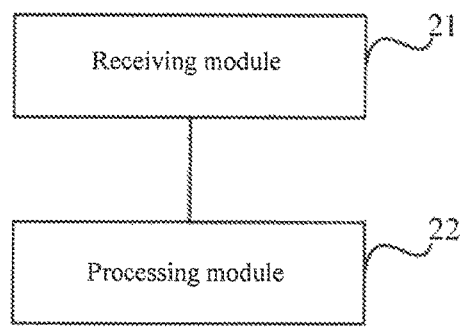
FIG. 4 is a schematic diagram of a UE according to the third embodiment of the present invention.

Based on the same inventive concept as the above-described method, a UE is also provided in the embodiment of the present invention. As shown in FIG. 4, the UE specifically includes:

Receiving module (21) for receiving the TM of a CC from the network side device;

Processing module (22) which is used to conduct the following: when the TM of the CC is codebook TM9 single-stream or codebook TM9 dual-stream, and the SCC enables the adaptive function between modes, if RSRP is greater the preset first threshold, and SINR is greater than the preset second threshold, the transmission mode is adapted to TM3; otherwise, the transmission mode is adapted to TM9 single-stream or TM9 dual-stream; or, when the TM of the CC is codebook TM9 four-stream or codebook TM9 eight-stream, and the SCC enables the adaptive function between modes, if RSRP is greater than the preset third threshold and SINR is greater than the preset fourth threshold, the transmission mode is adapted to TM9 four-stream or TM9 eight-stream; otherwise, the transmission mode is adapted to TM3.

Wherein, the modules of the device in the present invention may be integrated in one unit or deployed separately. The above modules can be combined into one module, or can be further divided into multiple sub-modules.

Embodiment 4

Based on the same inventive concept as the above-described method, a network side device is also provided in the embodiment of the present invention. As shown in FIG. 4, the network side device specifically includes:

Processor 500 for reading the programs in Memory 520 and conducts the following:

Determining the CC which is currently activated in the CA system. When CC configured with TM9 exists in the currently active component carriers, it determines the TM of the CC configured with TM9, and transmit data to the UE through Transceiver 510 according to the TM.

Transceiver 510 for receiving and transmitting data under the control of Processor 500

Preferably, Processor 500 is specifically used to determine whether the UE supports UL CA function when the CC configured with TM9 is a SCC; if the UE supports UL CA function, under codebook condition, the TM of the CC is determined as codebook TM9; or, under non-codebook condition, the TM of the CC is determined as non-codebook TM9; if the UE does not support UL CA function, under codebook condition, the TM of the CC is determined as codebook TM9; or, under non-codebook condition, the TM of the CC is determined as TM3.

Preferably, Processor 500 is specifically used to conduct the following: when the CC configured with TM9 is the PCC, under codebook condition, the TM of the CC is determined as codebook TM9; or, under non-codebook condition, the TM of the CC is determined as non-codebook TM9.

Preferably, Processor 500 is further used to determine whether the number of ports configured on the network side device is greater than or equal to 4 while determining the TM of the CC as codebook TM9; if the number of ports configured on the network side device is not greater than or equal to 4, the TM of the CC is determined as codebook TM9 single-stream or codebook TM9 dual-stream; if the number of ports configured on the network side device is greater than or equal to 4, it judges whether the maximum number of supported streams is greater than or equal to 4; if the number of streams supported by the UE is not greater than or equal to 4, the TM of the CC is determined as codebook TM9 single-stream or codebook TM9 dual-stream; if the maximum number of streams supported by the UE is greater than or equal to 4, the TM of the CC is determined as codebook TM9 four-stream or codebook TM9 eight-stream.

Preferably, Processor 500 is further used to send the TM of the CC to the UE via Transceiver 510 after determining the TM of the CC; when the TM of the CC is codebook TM9 single-stream or codebook TM9 dual-stream, and the SCC enables the adaptive function between modes, if RSRP is greater than the preset first threshold, and SINR is greater than the preset second threshold, the transmission mode is adapted to TM3; otherwise, the transmission mode is adapted to TM9 single-stream or TM9 dual-stream; when the TM of the CC is codebook TM9 four-stream or codebook TM9 eight-stream, and the SCC enables the adaptive function between modes, if RSRP is greater than the preset third threshold and SINR is greater than the preset fourth threshold, the transmission mode is adapted to TM9 four-stream or TM9 eight-stream; otherwise, the transmission mode is adapted to TM3.

Figure 5:
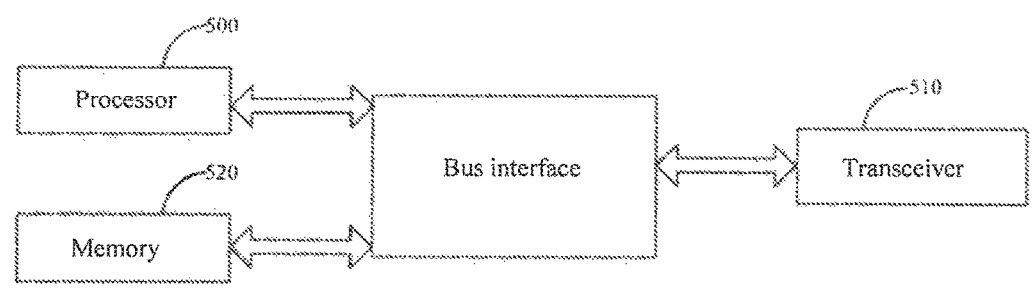
FIG. 5 is a schematic diagram of a network side device according to the fourth embodiment of the present invention.

Wherein, in FIG. 5, the bus architecture may include any number of interconnected busses and bridges, specifically the various circuits such as one or more processors or memories represented by Processor 500 and Memory 520 are linked together. The bus architecture may also link various other circuits, such as peripherals, voltage regulators and power management circuits, etc., which are well known in the art, and therefore will not be further described herein. The bus interface provides the needed interfaces. Transceiver 510 may include a plurality of elements, i.e., a transmitter and a transceiver, to provide units for communicating with various other devices over transmission medium. Processor 500 is responsible for managing the bus architecture and general processing, and Memory 520 can store data used by Processor 500 while performing operations.

Embodiment 5

Figure 6:
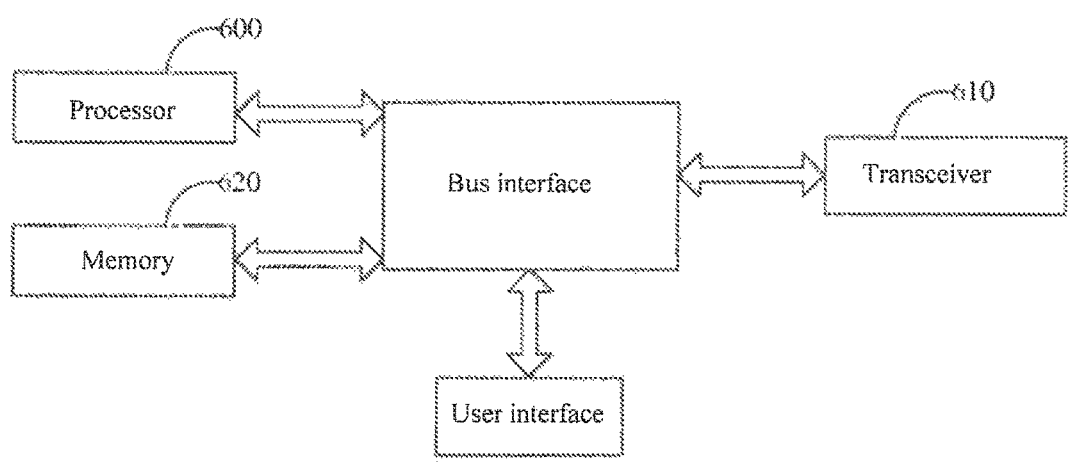
FIG. 6 is a schematic diagram of a network side device according to the fifth embodiment of the present invention.

Based on the same inventive concept as the above-described method, a UE is also provided in the embodiment of the present invention. As shown in FIG. 6, the UE specifically includes:

Transceiver 610 for receiving and transmitting data under the control of Processor 600.

Processor 600 for receiving the TM of CC from the network side device through Transceiver 610, reading the programs in Memory 620, and conduct the following:

When the TM of the CC is codebook TM9 single-stream or codebook TM9 dual-stream, and the SCC enables the adaptive function between modes, if RSRP is greater than the preset first threshold, and SINR is greater than the preset second threshold, the transmission mode is adapted to TM3; otherwise, the transmission mode is adapted to TM9 single-stream or TM9 dual-stream; or, when the TM of the CC is codebook TM9 four-stream or codebook TM9 eight-stream, and the SCC enables the adaptive function between modes, if RSRP is greater than the preset third threshold and SINR is greater than the preset fourth threshold, the transmission mode is adapted to TM9 four-stream or TM9 eight-stream; otherwise, the transmission mode is adapted to TM3.

Wherein, in FIG. 6, the bus architecture may include any number of interconnected busses and bridges, specifically the various circuits such as one or more processors or memories represented by Processor 600 and Memory 620 are linked together. The bus architecture may also link various other circuits, such as peripherals, voltage regulators and power management circuits, etc., which are well known in the art, and therefore will not be further described herein. The bus interface provides the needed interfaces. Transceiver 610 may include a plurality of elements, i.e., a transmitter and a transceiver, to providing units for communicating with various other devices over transmission medium. For different user devices, the user interface may also be an interface capable of externally/internally connecting desired devices, including but not limited to keypad, display, speaker, microphone, joystick, and the like.

Processor 600 is responsible for managing bus architecture and general processing, and Memory 620 can store data used by Processor 600 when it is performing operations.

It is to be understood by those skilled in the art that embodiments of the present invention may be provided as a method, system, or computer program product. Thus, the present invention may take the form of a fully hardware embodiment, a fully software embodiment, or an embodiment combining software and hardware. Moreover, the invention may take the form of a computer program product implemented on one or more computer usable storage media (including but not limited to disk storage, CD-ROM, optical storage, etc.) containing computer usable program codes therein.

The present invention is described with reference to flowcharts and/or block diagrams of a method, a device (system), and computer program product according to the embodiment of the present invention. It is to be understood that each process and/or block in the flowcharts and/or block diagrams, as well as combinations of processes and/or blocks in the flowcharts and/or block diagrams, may be implemented by computer program instructions. These computer program instructions may be provided to a processor of a general purpose computer, a special purpose computer, an embedded processor, or other programmable data processing device to produce a machine, such that instructions generated by a processor of a computer or other programmable data processing device can generate an apparatus for implementing the functions specified in one process or processes of a flowchart or one block or blocks in the block diagrams.

The computer program instructions may also be stored in a computer readable memory capable of directing a computer or other programmable data processing apparatus to operate in a particular manner, such that the instructions stored in the computer readable memory produce an article comprising instructions, which can implement function(s) specified in one process or processes in the flowcharts or one block or blocks in the block diagrams.

These computer program instructions may also be loaded onto a computer or other programmable data processing device, such that a series of operational steps are performed on a computer or other programmable device to produce computer-implemented processing, and to provide the steps for execution on a computer or other programmable device for implementing the function(s) specified in a process or processes in the flowchart and/or a block or blocks in the block diagrams.

While the preferred embodiments of the present invention have been described, those skilled in the art will be able to make other changes and modifications to the basic inventive concepts if they become aware of them. Therefore, the appended claims are to be interpreted as including preferred embodiments as well as all changes and modifications that fall within the scope of the invention.

It will be apparent to those skilled in the art that various modifications and changes can be made to the embodiments of the present invention without departing from the spirit and scope of the embodiments of the present invention. Thus, it is intended that the present invention covers these modifications and changes if they fall within the scope of the appended claims or its equivalent technologies.

The invention claimed is:

1. A TM9-based carrier aggregation method, comprising:
   determining by a network side device that one or more component carriers (CCs) are currently activated in a carrier aggregation (CA) system;
   in response to determining that a CC configured with a transmission mode 9 (TM9) exists among currently activated CCs in the CA system, determining by the network side device a transmission mode (TM) for the CC configured with the TM9; and
   transmitting, by the network side device, data to a user equipment (UE) according to the TM for the CC, wherein:
   when the CC configured with the TM9 is a secondary component carrier (SCC), the network side device determines the transmission mode (TM) for the CC by:
      judging whether the UE supports an uplink (UL) CA function;
      when the UE supports the UL CA function:
         under codebook condition, determining the TM for the CC as codebook TM9; or
         under non-codebook condition, determining the TM for the CC as non-codebook TM9; and
      when the UE does not support the UL CA function:
         under codebook condition, determining the TM for the CC as the codebook TM9; or
         under non-codebook condition, determining the TM for the CC as transmission mode 3 (TM3).

2. The method according to claim 1, wherein the network side device determines the TM for the CC as the codebook TM9 by:
   judging whether a number of ports configured on the network side device is greater than or equal to 4;
   when the number of ports configured on the network side device is not greater than or equal to 4, determining the TM for the CC as codebook TM9 single-stream or codebook TM9 dual-stream; and
   when the number of ports configured on the network side device is greater than or equal to 4, judging whether a maximum number of streams supported by the UE is greater than or equal to 4:
      when the maximum number of streams supported by the UE is not greater than or equal to 4, determining the TM for the CC as the codebook TM9 single-stream or the codebook TM9 dual-stream; and when the maximum number of streams supported by the UE is greater than or equal to 4, determining the TM for the CC as codebook TM9 four-stream or codebook TM9 eight-stream.

3. The method according to claim 2, further comprising:
after the network side device determines the TM for the CC:
  transmitting by the network side device the TM for the CC to the UE;
  when the TM for the CC is the codebook TM9 single-stream or the codebook TM9 dual-stream, and the SCC enables an adaptive function between modes:
    if RSRP (Reference Symbol Reception Power) is greater than a preset first threshold, and SINR (Signal-to-Interference-plus-Noise Ratio) is greater than a preset second threshold, adapting a transmission mode to the TM3 by the UE; and
    otherwise, adapting a transmission mode to the TM9 single-stream or the TM9 dual-stream; and
  when the TM for the CC is the codebook TM9 four-stream or the codebook TM9 eight-stream, and the SCC enables the adaptive function between modes:
    if the RSRP is greater than a preset third threshold, and the SINR is greater than a preset fourth threshold, adapting a transmission mode to the codebook TM9 four-stream or the codebook TM9 eight-stream by the UE; and
    otherwise, adapting a transmission mode to the TM3.

4. A TM9-based carrier aggregation method, comprising:
determining by a network side device that one or more component carriers (CCs) are currently activated in a carrier aggregation (CA) system;
in response to determining that a CC configured with a transmission mode 9 (TM9) exists among currently activated CCs in the CA system, determining by the network side device a transmission mode (TM) for the CC configured with the TM9; and
transmitting by the network side device data to a user equipment (UE) according to the TM for the CC, wherein:
when the CC configured with the TM9 is a primary component carrier (PCC), the network side device determines the TM for the CC by:
  under codebook condition, determining the TM for the CC as codebook TM9; or
  under non-codebook condition, determining the TM for the CC as non-codebook TM9.

5. The method according to claim 4, wherein the network side device determines the TM for the CC as the codebook TM9 by:
judging whether a number of ports configured on the network side device is greater than or equal to 4;
when the number of ports configured on the network side device is not greater than or equal to 4, determining the TM for the CC as codebook TM9 single-stream or codebook TM9 dual-stream; and
when the number of ports configured on the network side device is greater than or equal to 4, judging whether a maximum number of streams supported by the UE is greater than or equal to 4:
  when the maximum number of streams supported by the UE is not greater than or equal to 4, determining the TM for the CC as the codebook TM9 single-stream or the codebook TM9 dual-stream; and
  when the maximum number of streams supported by the UE is greater than or equal to 4, determining the TM for the CC as codebook TM9 four-stream or codebook TM9 eight-stream.

6. The method according to claim 5, further comprising:
after the network side device determines the TM for the CC:
  transmitting by the network side device the TM for the CC to the UE;
  when the TM for the CC is the codebook TM9 single-stream or the codebook TM9 dual-stream, and a secondary component carrier (SCC) enables an adaptive function between modes:
    if RSRP (Reference Symbol Reception Power) is greater than a preset first threshold, and SINR (Signal-to-Interference-plus-Noise Ratio) is greater than a preset second threshold, adapting a transmission mode to transmission mode (TM3) by the UE; and
    otherwise, adapting a transmission mode to the codebook TM9 single-stream or the codebook TM9 dual-stream by the UE; and
  when the TM of the CC is the codebook TM9 four-stream or the codebook TM9 eight-stream, and the SCC enables the adaptive function between modes:
    if the RSRP is greater than a preset third threshold, and the SINR is greater than a preset fourth threshold, adapting a transmission mode to the codebook TM9 four-stream or the codebook TM9 eight-stream by the UE; and
    otherwise, adapting a transmission mode to the TM3 by the UE.

7. A TM9-based carrier aggregation (CA) method, comprising:
receiving by a user equipment (UE) a transmission mode (TM) of a component carrier (CC) from a network side device;
when the TM of the CC is codebook TM9 single-stream or codebook TM9 dual-stream, and a SCC enables an adaptive function between modes:
  if RSRP (Reference Symbol Reception Power) is greater than a preset first threshold and SINR (Signal-to-Interference-plus-Noise Ratio) is greater than a preset second threshold, adapting by the UE a transmission mode to transmission mode 3 (TM3); and
  otherwise, adapting by the UE a transmission mode to the codebook TM9 single-stream or the codebook TM9 dual-stream; and
when the TM of the CC is codebook TM9 four-stream or codebook TM9 eight-stream, and the SCC enables the adaptive function between modes:
  if the RSRP is greater than a preset third threshold, and the SINR is greater than a preset fourth threshold, adapting by the UE a transmission mode to the codebook TM9 four-stream or the codebook TM9 eight-stream; and
  otherwise, adapting by the UE a transmission mode to the TM3.

8. A network side device, comprising:
a processor programmed to:
  determine one or more component carriers (CCs) that are currently activated in a carrier aggregation (CA) system;
  determine a transmission mode (TM) of a component carrier (CC) configured with transmission mode 9 (TM9) when the CC configured with the TM9 exists among currently active CCs; and transmit data to a user equipment (UE) according to the TM for the CC, wherein:

determining the TM of the CC includes:
when the CC configured with the TM9 is a secondary component carrier (SCC), judging whether the UE supports an uplink (UL) CA function;
when the UE supports the UL CA function:
under codebook condition, determining the TM of the CC as codebook TM9; or
under non-codebook condition, determining the TM of the CC as non-codebook TM9; and
when the UE does not support the UL CA function:
under codebook condition, determining the TM of the CC as the codebook TM9; or
under non-codebook condition, determining the TM of the CC as transmission mode 3 (TM3).

9. The network side device according to claim 8, wherein the processor is programmed to:
determine whether a number of ports configured on the network side device is greater than or equal to 4 while determining the TM of the CC as the codebook TM9;
when the number of ports configured on the network side device is not greater than or equal to 4, determine the TM of the CC as codebook TM9 single-stream or codebook TM9 dual-stream; and
when the number of ports configured on the network side device is greater than or equal to 4, judge whether a maximum number of streams supported by the UE is greater than or equal to 4:
when the maximum number of streams supported by the UE is not greater than or equal to 4, determine the TM of the CC as the codebook TM9 single-stream or the codebook TM9 dual-stream; and
when the maximum number of streams supported by the UE is greater than or equal to 4, determine the TM of the CC as codebook TM9 four-stream or codebook TM9 eight-stream.

10. The network side device according to claim 9, wherein:
after the TM of the CC is determined, the TM of the CC is transmitted to the UE;
when the TM of the CC is the codebook TM9 single-stream or the codebook TM9 dual-stream, and the SCC enables an adaptive function between modes:
if RSRP (Reference Symbol Reception Power) is greater than a preset first threshold, and SINR (Signal-to-Interference-plus-Noise Ratio) is greater than a preset second threshold, a transmission mode is adapted to the TM3 by the UE; and
otherwise, a transmission mode is adapted by the UE to the codebook TM9 single-stream or the codebook TM9 dual-stream; and
when the TM of the CC is the codebook TM9 four-stream or the codebook TM9 eight-stream, and the SCC enables the adaptive function between modes:
if the RSRP is greater than a preset third threshold, and the SINR is greater than a preset fourth threshold, a transmission mode is adapted by the UE to the codebook TM9 four-stream or the codebook TM9 eight-stream; and
otherwise, a transmission mode is adapted by the UE to the TM3.

11. A network side device, comprising:
a processor programmed to:
determine one or more component carriers (CCs) that are currently activated in a carrier aggregation (CA) system;
determine a transmission mode (TM) of a component carrier (CC) configured with transmission mode 9 (TM9) when the CC configured with the TM9 exists among currently active CCs; and
transmit data to a user equipment (UE) according to the TM for the CC, wherein:
determining the TM of the CC includes:
when the CC configured with the TM9 is a primary component carrier (PCC):
under codebook condition, determining the TM of the CC as codebook TM9; or
under non-codebook condition, determining the TM of the CC as non-codebook TM9.

12. The network side device according to claim 11, wherein
the processor is programmed to:
determine whether a number of ports configured on the network side device is greater than or equal to 4 while determining the TM of the CC as the codebook TM9;
when the number of ports configured on the network side device is not greater than or equal to 4, determine the TM of the CC as codebook TM9 single-stream or codebook TM9 dual-stream; and
when the number of ports configured on the network side device is greater than or equal to 4, judge whether a maximum number of streams supported by the UE is greater than or equal to 4:
when the maximum number of streams supported by the UE is not greater than or equal to 4, determine the TM of the CC as the codebook TM9 single-stream or the codebook TM9 dual-stream; and
when the maximum number of streams supported by the UE is greater than or equal to 4, determine the TM of the CC as codebook TM9 four-stream or codebook TM9 eight-stream.

13. The network side device according to claim 12, wherein:
after the TM of the CC is determined, the TM of the CC is transmitted to the UE;
when the TM of the CC is the codebook TM9 single-stream or the codebook TM9 dual-stream, and a secondary component carrier (SCC) enables an adaptive function between modes:
if RSRP (Reference Symbol Reception Power) is greater than a preset first threshold, and SINR (Signal-to-Interference-plus-Noise Ratio) is greater than a preset second threshold, a transmission mode is adapted to transmission mode (TM3) by the UE; and
otherwise, a transmission mode is adapted to the codebook TM9 single-stream or the codebook TM9 dual-stream by the UE; and
when the TM of the CC is the codebook TM9 four-stream or the codebook TM9 eight-stream, and the SCC enables the adaptive function between modes:
if the RSRP is greater than a preset third threshold, and the SINR is greater than a preset fourth threshold, a transmission mode is adapted to the codebook TM9 four-stream or the codebook TM9 eight-stream by the UE; and
otherwise, a transmission mode is adapted to the TM3 by the UE.

14. A user equipment (UE), comprising:
a processor programmed to:
- receive a transmission mode (TM) of a component carrier (CC) from a network side device; and
- when the TM of the CC is codebook TM9 single-stream or codebook TM9 dual-stream, and a secondary component carrier (SCC) enables an adaptive function between modes:
  - if RSRP (Reference Symbol Reception Power) is greater than a preset first threshold, and SINR (Signal-to-Interference-plus-Noise Ratio) is greater than a preset second threshold, adapt a transmission mode to transmission mode 3 (TM3); and
  - otherwise, adapt the a transmission mode to the codebook TM9 single-stream or the codebook TM9 dual-stream; and
- when the TM of the CC is codebook TM9 four-stream or codebook TM9 eight-stream, and the SCC enables the adaptive function between modes:
  - if the RSRP is greater than a preset third threshold, and the SINR is greater than a preset fourth threshold, adapt a transmission mode to the codebook TM9 four-stream or the codebook TM9 eight-stream; and
  - otherwise, adapt a transmission mode to the TM3.

\* \* \* \* \*